(12) United States Patent
Turton et al.

(10) Patent No.: US 11,731,885 B2
(45) Date of Patent: Aug. 22, 2023

(54) COALESCING MEDIA FOR HYDRONIC AIR AND SEDIMENT SEPARATION DEVICE

(71) Applicant: FLUID HANDLING LLC., Morton Grove, IL (US)

(72) Inventors: Thomas Turton, West Seneca, NY (US); Stanley P. Evans, Jr., Tinley Park, IL (US); Scott D. Mosher, Ovid, NY (US); Christopher C. Kerback, Woodridge, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 167 days.

(21) Appl. No.: 17/204,141

(22) Filed: Mar. 17, 2021

(65) Prior Publication Data

US 2021/0292190 A1     Sep. 23, 2021

Related U.S. Application Data

(60) Provisional application No. 62/990,543, filed on Mar. 17, 2020.

(51) Int. Cl.
*C02F 1/20*     (2023.01)
*F24D 3/10*     (2006.01)
*C02F 1/00*     (2023.01)

(52) U.S. Cl.
CPC .............. *C02F 1/20* (2013.01); *F24D 3/1008* (2013.01); *C02F 2001/007* (2013.01); *C02F 2307/12* (2013.01)

(58) Field of Classification Search
None
See application file for complete search history.

(56) References Cited

U.S. PATENT DOCUMENTS

| 458,887 | A | 9/1891 | Devonshire |
| 653,500 | A | 7/1900 | Boyer |

(Continued)

FOREIGN PATENT DOCUMENTS

| EP | 2 390 013 A2 | 11/2011 |
| GB | 1 500 140 | 2/1978 |

(Continued)

OTHER PUBLICATIONS

U.S. Appl. No. 62/990,543, filed Mar. 17, 2020 (specification and drawings) (Year: 2020).*

(Continued)

*Primary Examiner* — Chester T Barry
(74) *Attorney, Agent, or Firm* — Ware, Fressola, Maguire & Barber LLP

(57) ABSTRACT

A coalescing removal separator includes a separator tank having a separator input configured to receive a fluid flowing through a system having entrained gasses and solid particles, having a tank wall configured to form a volume/chamber inside the separator tank to process the fluid, and having a separator output configured to provide processed fluid that is free of at least some of the entrained gasses and solid particles; and a coalescing media arranged in the volume/chamber of the separator tank, the coalescing media having at least one helically wound brush with a stem and intertwined bristles substantially filling the volume/chamber of the separator tank and being configured to enable the at least some of the entrained gasses and solid particles to come out of the fluid.

7 Claims, 5 Drawing Sheets

(56) References Cited

U.S. PATENT DOCUMENTS

| | | | |
|---|---|---|---|
| 870,138 A | | 11/1907 | Stump et al. |
| 4,051,033 A | * | 9/1977 | Blace .................. B01D 29/23 |
| | | | 210/483 |
| 4,229,386 A | * | 10/1980 | Lerner .................. B01J 19/30 |
| | | | 210/150 |
| 4,787,920 A | * | 11/1988 | Richard ................ B01D 50/60 |
| | | | 95/287 |
| 5,006,260 A | * | 4/1991 | Roques .............. B01D 17/0208 |
| | | | 210/708 |
| 5,194,231 A | * | 3/1993 | Gough .................. B01J 19/32 |
| | | | 210/150 |
| 5,443,724 A | * | 8/1995 | Williamson ......... B01D 17/045 |
| | | | 210/488 |
| 5,480,465 A | | 1/1996 | Cox |
| 5,490,874 A | * | 2/1996 | Kuster ............... B01D 19/0057 |
| | | | 96/204 |
| 5,616,244 A | | 4/1997 | Seureau et al. |
| 5,676,740 A | * | 10/1997 | Schwartz ............... B01D 19/00 |
| | | | 96/204 |
| 5,861,087 A | | 1/1999 | Manning |
| 6,893,485 B2 | * | 5/2005 | MacDuff ............. F16K 24/048 |
| | | | 285/31 |
| 7,037,432 B2 | | 5/2006 | Eades et al. |
| 8,177,975 B2 | * | 5/2012 | Schipper ............. F24D 19/087 |
| | | | 96/155 |
| 8,360,251 B2 | | 1/2013 | Wieczorek et al. |
| 9,656,894 B2 | | 5/2017 | Snydmiller et al. |
| 10,035,153 B2 | | 7/2018 | Millard et al. |
| 10,081,557 B2 | | 9/2018 | Profit et al. |
| 2010/0050871 A1 | | 3/2010 | Moy et al. |
| 2016/0332172 A1 | | 11/2016 | Millard et al. |

FOREIGN PATENT DOCUMENTS

| | | |
|---|---|---|
| RU | 153348 U1 | 7/2015 |
| SU | 656639 A1 | 4/1979 |
| WO | 99/37391 | 7/1999 |

OTHER PUBLICATIONS

"iDronics™, Air & Dirt Elimination in Hydronic Systems," Caleffi North America Inc., caleffi.com, 2007. https://www.caleffi.com/sites/default/files/file/idronics_2_na-r1.pdf; Figure 23, p. 14.

"Wess-Vent Air & Dirt Separator," Wessel Company, westank.com, WVA-112 8/04, Aug. 2004. https://westank.com/wp-content/docs/technical/i&o-wva.pdf; Illustrations.

"Rolairtrol Air Separator Hot & Chilled Water," Xylem Inc., bellgossett.com, accessed: Mar. 2019. http://bellgossett.com/air-sediment-control-expansion/tangential-air-separators/rolairtrol-air-separator-for-hot-and-chilled-water-systems; Illustrations.

"Home: High Efficiency Coalescing Air Separators," Spiro Therm, spirotherm.com, accessed: Mar. 2019. http://www.spirotherm.com; Illustrations.

English translation of SU656639A1.

English Abstract of RU153348.

XYLEM; "Hydronic Heating and Plumbing Products"; Product Catalogue; May 2019 (retrieved on May 20, 2021 from the Internet: https://documentlibrary.xylemappliedwater.com/wp-content/blogs.dir/22/files/2012/07/a-50ij-bg-Hydronic_Heating_and_Plumbing_brochure.pdf?_GA-2.1781297.1243854574.1621561709-808249394); p. 34.

* cited by examiner

Figure 3A
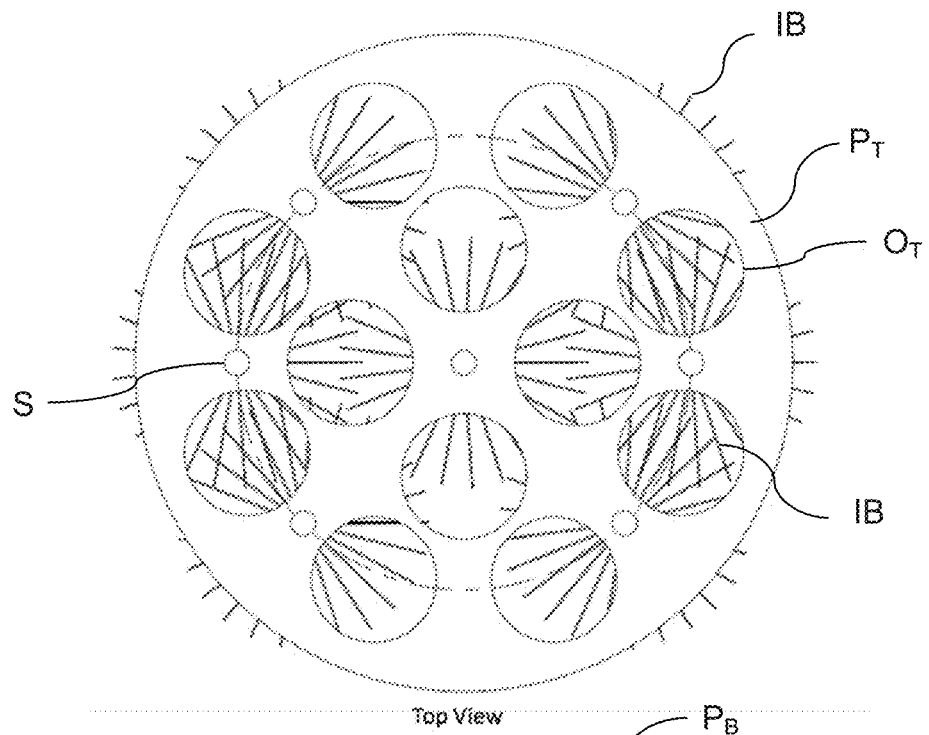
Top View
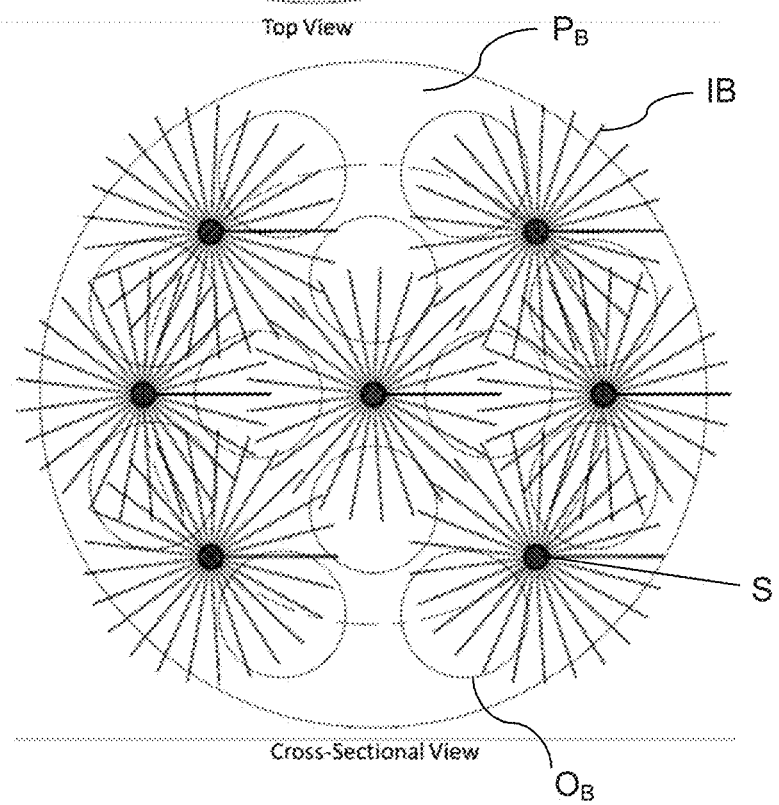
Cross-Sectional View
Figure 3B

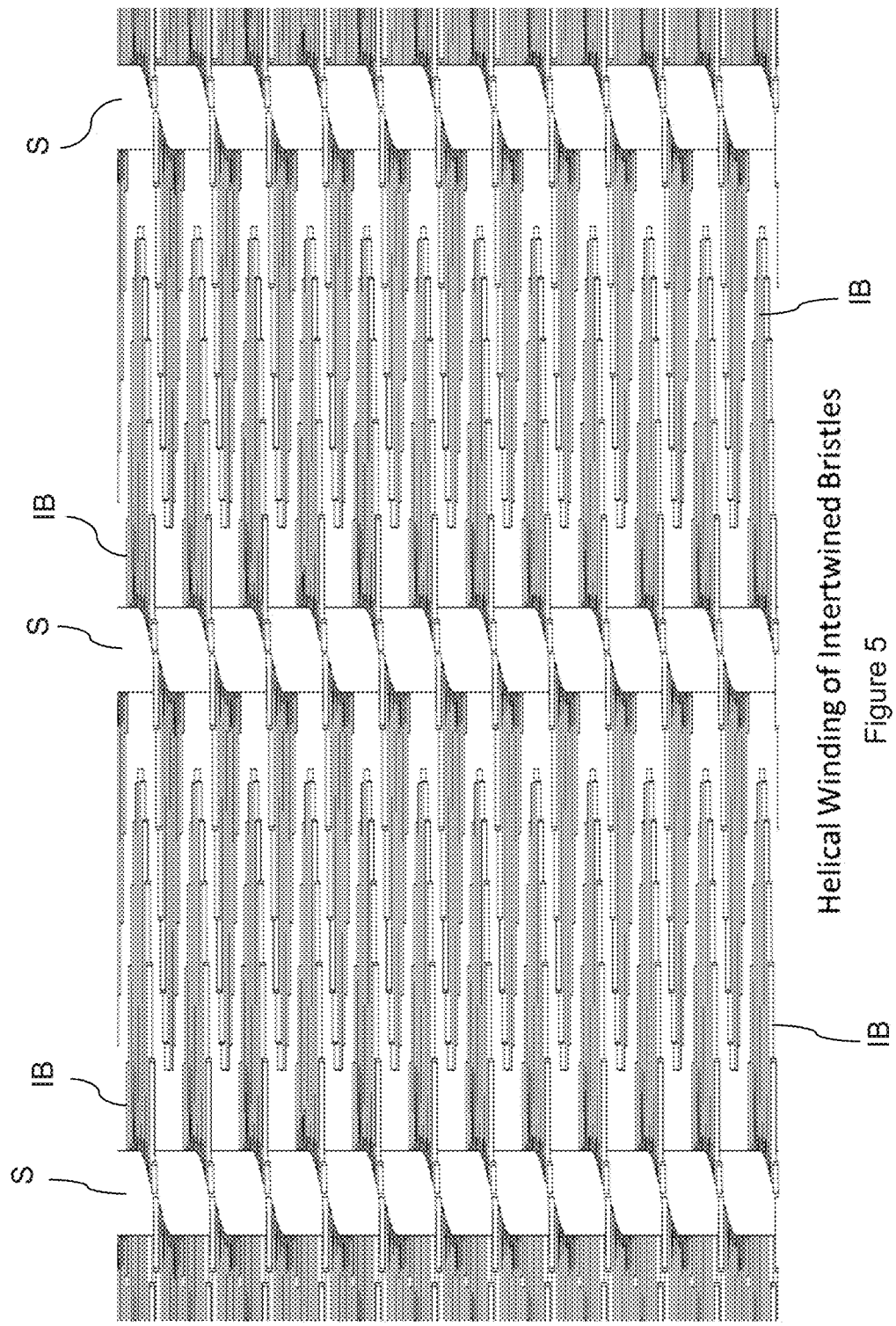

COALESCING MEDIA FOR HYDRONIC AIR AND SEDIMENT SEPARATION DEVICE

CROSS-REFERENCE TO RELATED APPLICATION

This application claims benefit to provisional patent application Ser. No. 62/990,543, filed 17 Mar. 2020, which is hereby incorporated by reference in its entirety.

BACKGROUND OF THE INVENTION

1. Field of the Invention

The present invention relates to a separation device having coalescing media; and more particularly relates to a hydronic air and sediment separation device for a pumping system.

2. Brief Description of Related Art

Coalescing removal separators are devices typically installed on hydronic HVAC systems to remove entrained gases (such as air) and solid particles (such as iron oxide) from the fluid flowing through the system. Gasses trapped in a hydronic system lead to potentially harmful corrosion. Solid particulates collect into sediment that can foul moving components in pumps or valves and damage sensors in the system. By way of example, the assignee of the present invention currently manufactures an Enhanced Air Separator (EAS), which can be found at Enhanced Air Separator—EAS—Xylem Applied Water Systems—United States (bellgossett.com).

Coalescing removal separators work by passing the system fluid into a tank, through a coalescent media, and back to the system. The action of passing the fluid through the media enables the entrained gasses and particles to be removed from the system. The media disrupts the fluid flow and slows the fluid velocity, which allows gas bubbles to come out of solution and, through their natural buoyancy, float to the top of the separator tank to be vented out of the system. Likewise, the reduction in fluid velocity allows solids in the fluid, which are heavier than the system fluid to come out of solution and drop to the bottom of the tank to be removed through a blow-down action. The media also provides a surface for dissolved gasses and solids to collect, or coalesce, around. As more dissolved gas or solids pass through the media pack, the molecules will continue to coalesce until they are either buoyant enough to float to the top or heavy enough to drop to the bottom.

One problem with current coalescing removal separator media is that they significantly increase the pressure drop of the unit, which can negatively impact the overall system efficiency. Another issue is that they may not effectively remove gasses or solids due to their designs.

Other brush type media has been used for coalescing separation in hydronic systems, however, the brush media is tightly bundled and the bristles are randomly intermeshed. This also increases the pressure drop of a separator unit. The tightly bundled random bristles do not effectively allow for removal of solids. As solids can collect and build up in the random bristles, the pressure drop will continue to increase as well, further reducing the efficiency of the hydronic system.

Moreover, it is also noted that Fabricated Products in the UK manufactures a separator with brush media as well. These units utilize brushes that are randomly arranged and tightly packed, which increases pressure drop and reduces system efficiency. Both of these types of product do not do a good enough job at eliminating system contaminants.

SUMMARY OF THE INVENTION

In summary, the present invention provides a coalescing separator media that improves the pressure drop characteristics across the separator while improving the ability of the device to more effectively remove gasses and solids from the system fluid. This media consists of a series of helically wound stainless steel brushes arranged such that the brushes fill a large portion of the volume of the separator tank and their bristles are intertwined. The fluid flows through the brush media making contact with the bristles and stem to slow down the fluid velocity, enabling the entrained gasses and solids to come out of solution and either rise or sink, respectively. Bristles and stems of the brush media provide multiple surfaces for dissolved gasses and solids to coalesce around.

The helical winding of the brush media serves two purposes. First, the helix formed from the bristle winding encourages the entrained gas bubbles, or those formed through the coalescence of the dissolved gasses, to rise to the top of the separator tank to be vented. Second, the helical shape of the brush bristles allows the bristles to intertwine without interfering with each other. This interference can lead to increased pressure drop across the separator.

The brush media is to be held together with a pair of base plates, one at the top and one in the bottom. The media plates are to have a sufficient open area to permit gas bubbles to rise to the top of the separator and solids to fall to the bottom.

SPECIFIC EMBODIMENTS

According to some embodiments, the present invention may take the form of apparatus featuring a coalescing removal separator that includes:
a separator tank having a separator input configured to receive a fluid flowing through a system having entrained gas and solid particles, having a tank wall configured to form a volume/chamber inside the separator tank to process the fluid, and having a separator output configured to provide processed fluid that is free of at least some of the entrained gas and solid particles; and
a coalescing media arranged in the volume/chamber of the separator tank, the coalescing media having at least one helically wound brush with a stem and intertwined bristles substantially filling the volume/chamber of the separator tank and being configured to enable the at least some of the entrained gas and solid particles to come out of the fluid.

The apparatus may also include one or more of the following features:

The coalescing media may include a series of helically wound brushes.

The at least one helically wound brush may include at least one helically wound stainless steel brush.

The intertwined bristles and the stem are configured to contact the fluid flowing through the coalescing media to slow down the velocity of the fluid enabling the entrained air and solid particles to come out of the fluid and either rise to the top of the separator tank or fall to the bottom of the separator tank.

The coalescing media may include top and bottom plates configured to couple together the series of helically wound brushes for arranging, placing or mounting the coalescing media inside the separator tank.

The top and bottom plates may include top and bottom openings configured or formed therein to enable the entrained air and solid particles that come out of the fluid either to rise to the top of the separator tank or fall to the bottom of the separator tank.

The apparatus may include a hydronic HVAC system having the coalescing removal separator arranged therein to remove the entrained gas and solid particles from the fluid flowing in the hydronic HVAC system.

The separator tank may include a top vent configured to vent the entrained gas from the separator tank and remove them from the hydronic HVAC system.

The separator tank may include a bottom blow-down configured to provide the solid particles from the separator tank and remove them from the hydronic HVAC system.

According to some embodiments, the present invention may take the form of a coalescing removal separator featuring an inlet, a separator tank and an outlet.

The inlet may be configured to provide a fluid flowing through a system having entrained gases and solid particles at a fluid velocity.

The separator tank may include a top vent, a bottom blow-down, and at least one stem with a series of helically wound stainless steel brushes arranged thereon configured to:

fill a large portion of the volume of the separator tank,
make contact with the entrained gases and the solid particles in the fluid to slow down the fluid and decrease the fluid velocity,
cause at least some entrained gases to come out of the fluid as coalesced gases for venting from the top vent, and
cause at least some solid particles to come out of the fluid as coalesced solid particles for sinking towards the bottom blow-down.

The outlet may be configured to provide processed fluid from the separator tank to the system that is free of the coalesced gases and the coalesced solid particles.

BRIEF DESCRIPTION OF THE DRAWING

The drawing, which is not necessarily drawn to scale, includes FIGS. 1-5, as follows:

FIG. 3A is a top view the coalescing media shown in FIG. 2, according to some embodiments of the present invention.

FIG. 3B is a cross-sectional view of the coalescing media shown in FIG. 2 between top and bottom plates, according to some embodiments of the present invention.

FIG. 5 is a side view of a helically wound brush having a stem and intertwined bristles that forms part of the coalescing media shown in FIGS. 1 and 2, according to some embodiments of the present invention.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

Figure 1:
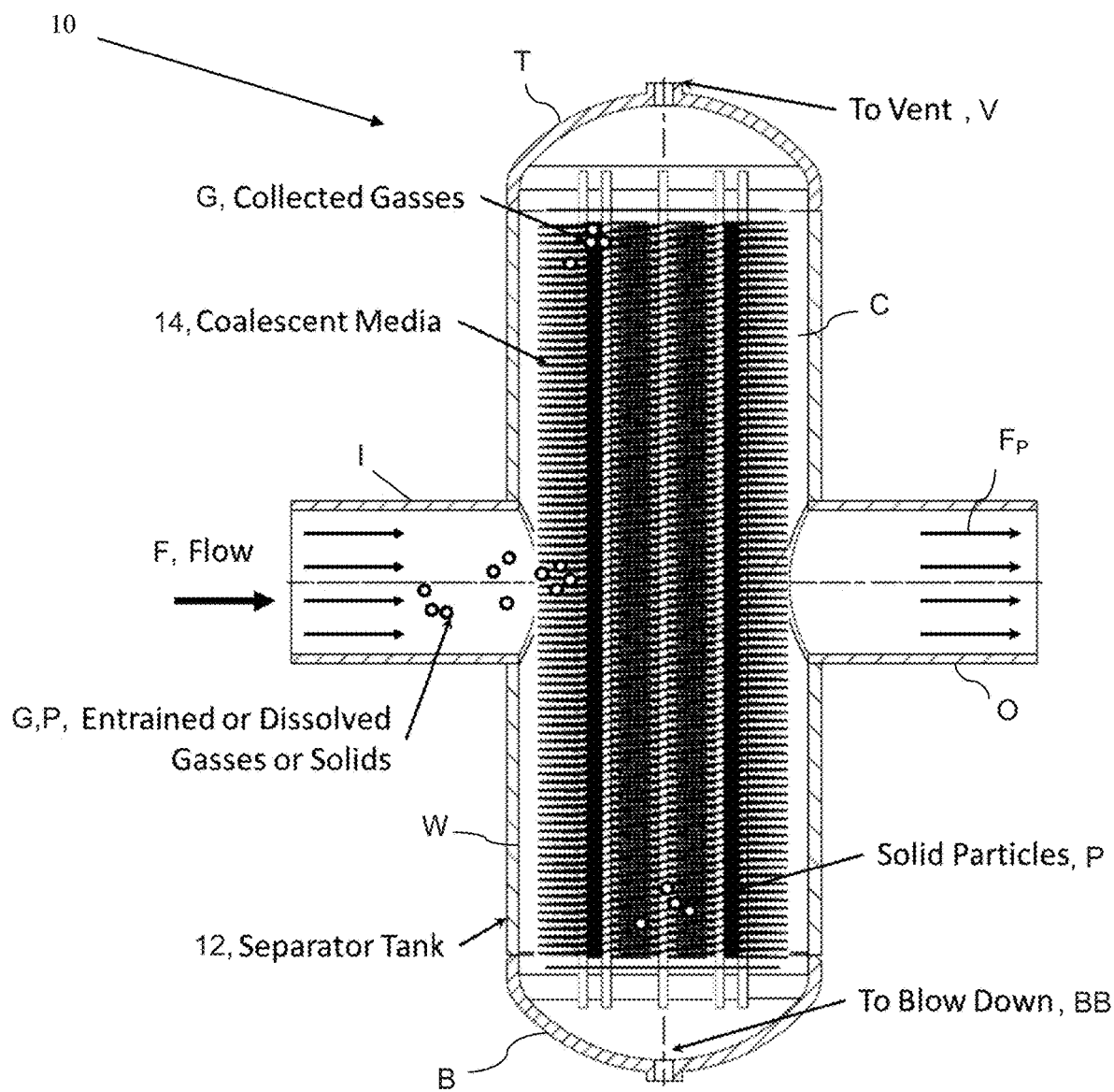
FIG. 1 is a cross-sectional view of apparatus featuring a coalescing removal separator, according to some embodiments of the present invention.

FIG. 1 shows apparatus generally indicated as 10 in the form of a coalescing removal separator having a separator tank 12 and a coalescing media 14 as shown in further detail in FIGS. 2-5.

The separator tank 12 has a separator input I configured to receive fluid F flowing through a system (not shown) having entrained gasses G and solid particles P. The separator tank 12 has a tank wall W configured to form a volume/chamber C inside the separator tank 12 to process the fluid F. The separator tank 12 also has a separator output O configured to provide processed fluid FP that is free of at least some of the entrained gasses G and solid particles P.

The coalescing media 14 is arranged in the volume/chamber C of the separator tank 12, and has at least one helically wound brush 16 with a stem S and intertwined bristles (IB) substantially filling the volume/chamber C of the separator tank 12 and being configured to enable the at least some of the entrained gasses G and solid particles P to come out of the fluid F, e.g., as coalesced gases and coalesced solid particles.

The scope of the invention is not intended to be limited to the amount of the entrained gasses G and the solid particles P freed from the fluid F. For example, embodiments are envisioned, and the scope of the invention is intended to include, freeing at least some of the entrained gasses G and solid particles P from the fluid F in some applications, freeing most of the entrained gasses G and solid particles P from the fluid F in other applications, as well as freeing substantially all of the entrained gasses G and solid particles P from the fluid F in still other applications.

Figure 4:
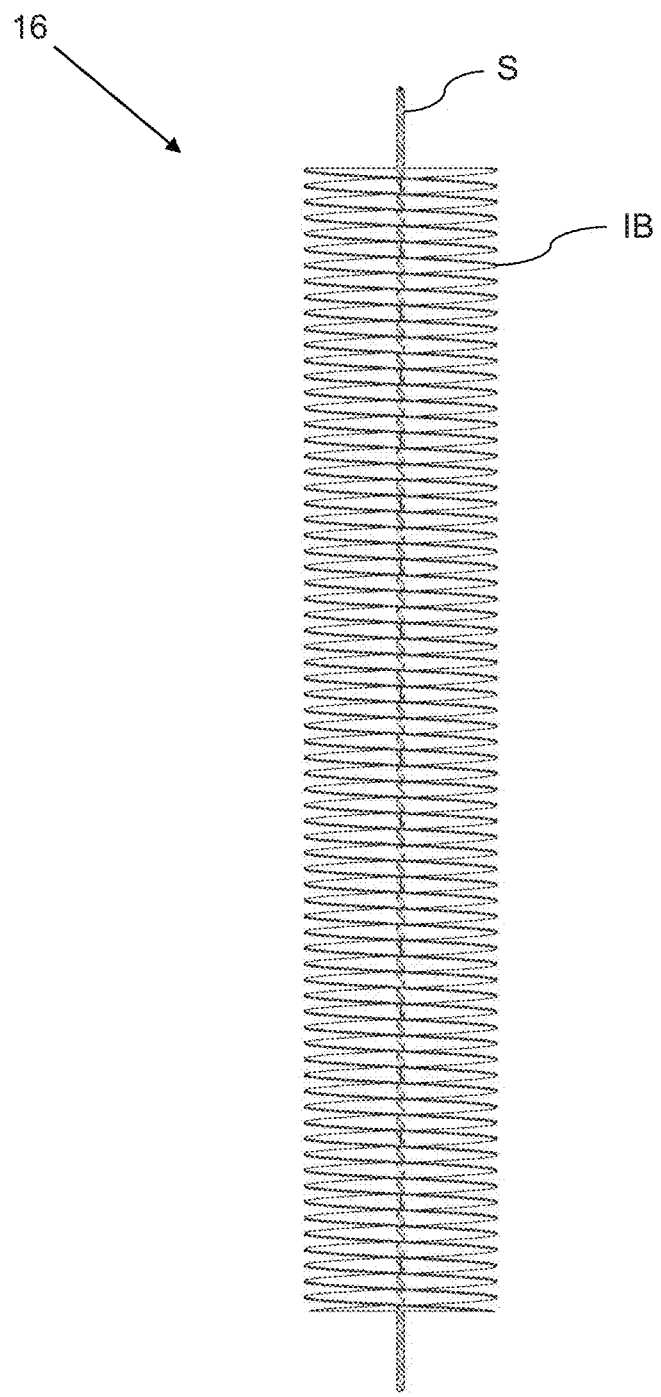
FIG. 4 is a side view of a helically wound brush that forms part of the coalescing media shown in FIGS. 1 and 2, according to some embodiments of the present invention.

By way of example, the coalescing media 14 may include a series of helically wound brushes 16, which is best shown in FIGS. 4-5. FIG. 2-5 show the coalescing media 14 having seven helically wound brushes 16, although the scope of the invention is not intended to be limited to any particular number of helically wound brushes 16. For instance, embodiments are envisioned, and the scope of the invention is intended to include, using more than seven helically wound brushes 16, or fewer than seven helically wound brushes 16. In FIG. 2-5, the seven helically wound brushes 16 are symmetrically arranged in three rows having a 2-3-2 format, although the scope of the invention is not intended to be limited to any particular arrangement or formatting of the helically wound brushes 16.

The helically wound brushes 16 may include, or take the form of, at least one helically wound stainless steel brush, although the scope of the invention is not intended to be limited to any particular type or kind of the material, of which the helically wound brushes 16 are made. For example, embodiments are envisioned, and the scope of the invention is intended to include, using other types or kinds of materials either now known or later developed in the future.

The stem S and the intertwined bristles IB are configured to contact the fluid F flowing through the coalescing media 14 to slow down the velocity of the fluid F enabling the entrained gasses G and solid particles P to come out of the fluid F, coalesce, and either rise to the top T of the separator tank 12 or fall to the bottom B of the separator tank 12. Helically wound brushes having a stem and intertwined bristles are known in the art, and the scope of the invention is not intended to be limited to any particular way in which the stem S and the intertwined bristles IB are configured. By way of example, and as one skilled in the art would appreciate, the term "intertwined" may be understood to mean "to unite by twining one with another" and the term "twine" may be understood to mean "to coil about a support."

The coalescing media 14 may include top and bottom plates $P_T$, $P_B$ configured to couple together the series of helically wound brushes 16 for arranging, placing or mounting the coalescing media 14 inside the separator tank 12. Consistent with that shown in FIG. 1, the coalescing media 14 may arranged or placed in the separator tank 12, or may be mounted in the separator tank 12, although the scope of the invention is not intended to be limited to any particular type or kind of arrangement, placement, or mounting of the coalescing media 14 inside the separator tank 12. By way of example, and consistent with that shown in FIGS. 1 and 2, the stems S of the helically wound brushes 16 are connected to the top and bottom plates $P_T$, $P_B$. These connections may take the form of welding the stems S of the helically wound brushes 16 to the top and bottom plates $P_T$, $P_B$, or epoxying the stems S of the brushes 16 to the top and bottom plates $P_T$, $P_B$, although the scope of the invention is not intended to be limited to any particular type or kind of connection of the stems S of the helically wound brushes 16 to the top and bottom plates $P_T$, $P_B$. For example, embodiments are envisioned, and the scope of the invention is intended to include, using other types or kinds of connections either now known or later developed in the future.

Figure 2:
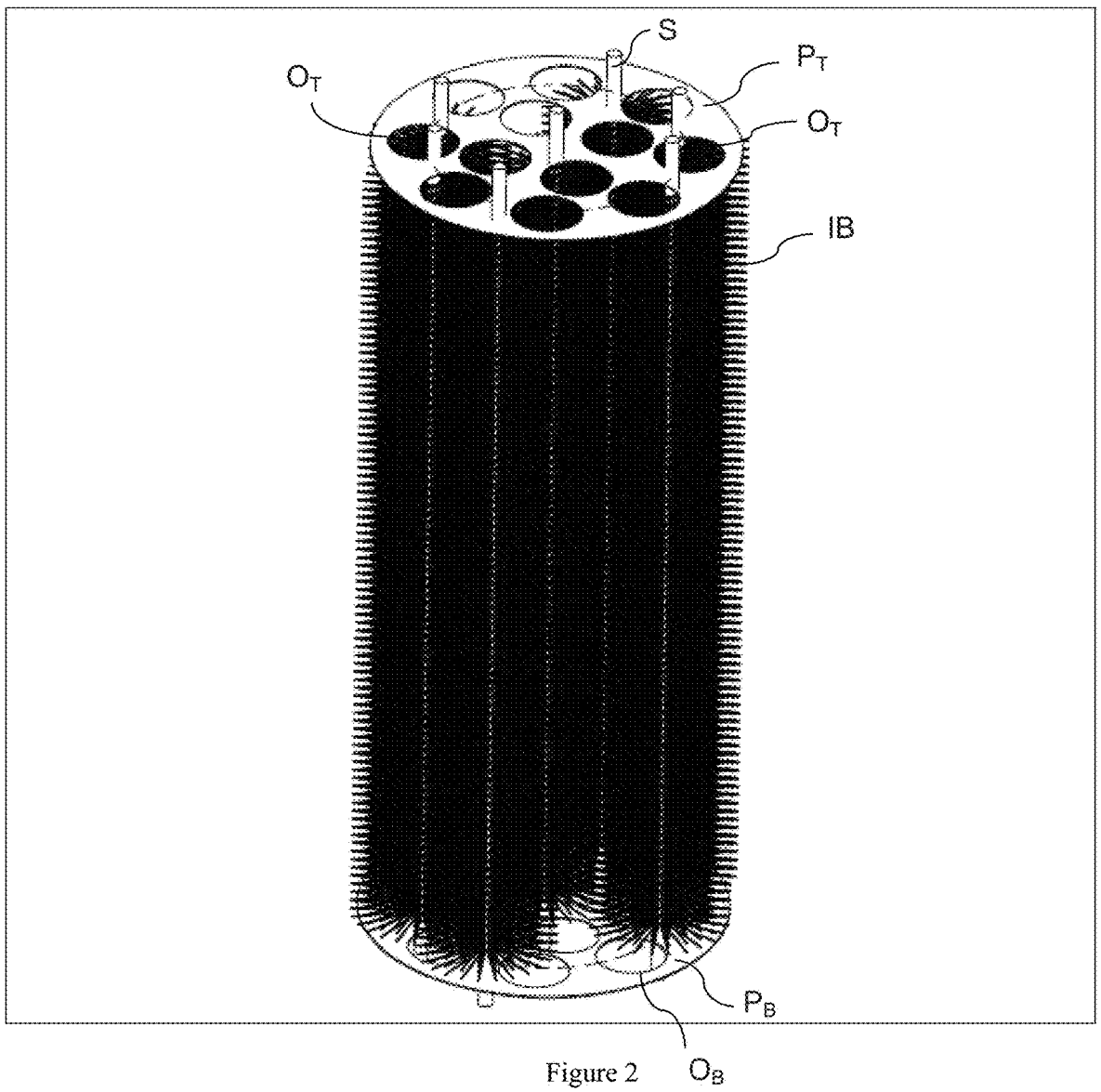
FIG. 2 is a perspective view of a coalescing media that may form part of the coalescing removal separator shown in FIG. 1, according to some embodiments of the present invention.

The top and bottom plates $P_T$, $P_B$ may include top and bottom openings $O_T$, $O_B$ configured or formed therein to enable the entrained gasses G and solid particles P that come out of the fluid F either to rise to the top T of the separator tank 12 or fall to the bottom B of the separator tank 12. FIGS. 2, 3A and 3B show the top and bottom plates $P_T$, $P_B$ having twelve top and bottom openings $O_T$, $O_B$, although the scope of the invention is not intended to be limited to any particular number of top and bottom openings $O_T$, $O_B$. For example, embodiments are envisioned, and the scope of the invention is intended to include, using more than twelve top and bottom openings $O_T$, $O_B$, or fewer than twelve top and bottom openings $O_T$, $O_B$. In FIGS. 2, 3A and 3B, the twelve top and bottom openings $O_T$, $O_B$ are symmetrically arranged in four rows having a 2-4-4-2 format, although the scope of the invention is not intended to be limited to any particular arrangement or formatting of the twelve top and bottom openings $O_T$, $O_B$.

The apparatus 10 may include a hydronic HVAC system having the coalescing removal separator 10 arranged therein to remove the entrained gasses G and solid particles P from the fluid F flowing in the hydronic HVAC system.

The separator tank 12 may include a top vent V configured to vent the entrained gasses G from the separator tank 12 and remove them from the system.

The separator tank 12 may include a bottom blow-down BB configured to provide the solid particles P from the separator tank 12 and remove them from the system.

The Scope of the Invention

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made such that the resulting embodiments would be different than the embodiments disclosed herein but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. Apparatus comprising:
   a coalescing removal separator that includes:
      a separator tank having a separator inlet configured to receive a fluid flowing through a system having a liquid containing entrained gas and solid particles, having a tank wall configured to form a volume/chamber inside the separator tank to process the fluid, having a top vent configured to vent any entrained gas separated from the fluid being processed, having a bottom blow-down configured to remove any solid particles separated from the fluid being processed, and having a separator outlet configured to provide processed fluid from the separator and back to the system; and
      a coalescing media arranged in the volume/chamber of the separator tank, the coalescing media having a plurality of helically wound brushes with a stem and intertwined bristles substantially filling the volume/chamber of the separator tank, having top and bottom plates configured to couple together the plurality of helically wound brushes for arranging, placing or mounting the coalescing media inside the separator tank, being configured to separate at least some of the entrained gas and solid particles from the processed fluid.

2. Apparatus according to claim 1, wherein the plurality of helically wound brushes comprise helically wound stainless steel brushes.

3. Apparatus according to claim 1, wherein the intertwined bristles and the stem are configured to contact the fluid flowing through the coalescing media to slow down the velocity of the fluid enabling the entrained gas and solid particles to separate from the fluid and either rise to the top of the separator tank and flow out the top vent, or fall to the bottom of the separator tank and flow out the bottom blow down.

4. Apparatus according to claim 1, wherein the top and bottom plates have top and bottom openings configured or formed therein to enable the entrained gas and solid particles that separate from the fluid either to rise to the top of the separator tank or fall to the bottom of the separator tank.

5. Apparatus according to claim 1, wherein the system is a hydronic HVAC system having the coalescing removal separator arranged therein to remove the entrained gas and solid particles from the fluid flowing in the hydronic HVAC system.

6. Apparatus according to claim 1, wherein the top vent is configured to vent separated entrained gas from the separator tank and the system.

7. Apparatus according to claim 1, wherein the bottom blow-down is configured to remove separated solid particles from the separator tank and the system.

* * * * *